H. BARKHAUSEN & P. KAMINSKI.
MEANS FOR ADJUSTING FROM A DISTANCE ANY DESIRED OBJECTS.
APPLICATION FILED DEC. 24, 1910.

1,123,067.

Patented Dec. 29, 1914.

H. BARKHAUSEN & P. KAMINSKI.
MEANS FOR ADJUSTING FROM A DISTANCE ANY DESIRED OBJECTS.
APPLICATION FILED DEC. 24, 1910.

1,123,067.

Patented Dec. 29, 1914.
4 SHEETS—SHEET 2.

Witnesses.
H. H. Knight
Ray J. Ernst.

Inventors
Paul Kaminski
and Heinrich Barkhausen
by their attorneys

H. BARKHAUSEN & P. KAMINSKI.
MEANS FOR ADJUSTING FROM A DISTANCE ANY DESIRED OBJECTS.
APPLICATION FILED DEC. 24, 1910.

1,123,067.

Patented Dec. 29, 1914.
4 SHEETS—SHEET 3.

Witnesses
H. H. Knight
Ray J. Ernst.

Inventors
Paul Kaminski
and Heinrich Barkhausen
by their attorneys

H. BARKHAUSEN & P. KAMINSKI.
MEANS FOR ADJUSTING FROM A DISTANCE ANY DESIRED OBJECTS.
APPLICATION FILED DEC. 24, 1910.

1,123,067.

Patented Dec. 29, 1914.
4 SHEETS—SHEET 4.

UNITED STATES PATENT OFFICE.

HEINRICH BARKHAUSEN, OF CHARLOTTENBURG, AND PAUL KAMINSKI, OF SPANDAU, NEAR BERLIN, GERMANY, ASSIGNORS TO SIEMENS & HALSKE, A. G., OF BERLIN, GERMANY.

MEANS FOR ADJUSTING FROM A DISTANCE ANY DESIRED OBJECTS.

1,123,067.  Specification of Letters Patent.  Patented Dec. 29, 1914.

Application filed December 24, 1910. Serial No. 599,173.

*To all whom it may concern:*

Be it known that we, HEINRICH BARKHAUSEN and PAUL KAMINSKI, subjects of the German Emperor, and respectively residing at Charlottenburg and Spandau, near Berlin, Germany, have invented certain new and useful Improvements in Means for Adjusting from a Distance any Desired Objects, of which the following is a specification.

Our invention relates to an arrangement for adjusting from a distance or regulating objects or devices by means of signaling in any desired manner, and a primary object is to increase the exactness of such adjustments to any desired extent.

The invention primarily consists in providing the member which is to be adjusted from a distance with at least two adjusting devices, of which one is for rough adjustment, while the other enables the member to be more accurately adjusted or, in other words, in providing that when the devices of the one kind are slightly moved they cause large movements of the member to be adjusted, whereas even when great movements are imparted to the adjusting devices of the other kind these cause only small movements of the member to be adjusted. In addition, the adjusting devices must be able to be actuated in succession in any desired order or simultaneously; it is however immaterial whether one or more of them are driven for the time being by a positive connection, e. g. through the medium of gearing.

Another object of the invention is to connect mechanically the various adjusting devices in series in such manner that the following adjusting device in each instance admits of more exact adjustment within the individual stages or steps of adjustment of the previous adjusting device. In this manner it is possible to make the final adjustment in each case as exact as is required in practice. The adjusting devices may be driven manually or by motive force, or both modes of driving may be simultaneously available in order to have a reserve. Likewise, compressed air, steam or water under pressure can be employed for the adjustment. In practice, the adjusting device of the next stage together with its driving means will generally be carried by the previous device for rougher adjustment. The adjusting devices can also serve, either with or without positive connection by means of wheel gearing or the like, for making the adjustment in one and the same stage finer.

The adjusting device may be manually operated either according to signals transmitted optically or acoustically to the place where the device to be adjusted is erected, or they may be adjusted with the aid of special transmission of power from the place of signaling. In the latter event provision must be made for sending a reply to a signal in any known manner to the sender station. The arrangement for sending replies can be dispensed with, according to the invention, when electric transmission devices are utilized, in which the senders and receivers operate synchronously, and when either the receiver itself is employed for actuating the adjusting devices by motive power, or at least the driving motors are controlled by means of the receivers of such transmission devices.

The invention also comprehends the arrangement of indicating devices which are located in immediate proximity to the member to be adjusted and are each provided with a suitable scale which renders visible the signals either as numbers or colors, or by means of special marks. Owing to the necessity of having number adjacent to number, color beside color or mark beside mark when the adjustment is correct, the possibility of incorrect adjustments is prevented as much as possible. Of course when a plurality of adjusting devices are connected in series which, as mentioned above, are supported upon each other, these indicating devices must be attached to the members of the preceding stage in each case and be moved by them. Further, according to the invention, when using electric transmission of signals and synchronous senders and receivers, we provide beside each principal signaling system comprising sender and receiver, an auxiliary signaling system which likewise comprises a sender and a receiver operating synchronously therewith, whose range of adjustment is, however, much smaller than the range of adjustment of the principal signaling system, so that many revolutions of the pointer in the auxiliary system are necessary in order to bring about stment corresponding to only one
n of the pointer in the principal
system. In addition, we arrange
of the receiver scales of the two
additional pointers which are con-
or example, by gears having a ratio
mission in proportion to the range
tments of the two signaling sys-
hen, if the second pointer of the
l receiver is placed opposite the
l pointer, the second pointer of
iliary system will indicate quite
ven quite small deviations from ex-
stment, and it is readily possible,
eans of a manually-operated crank,
t the error by placing the second
at the auxiliary scale opposite its
l pointer. In this manner indi-
djustments at the receiver can be
o correspond as exactly as possible
djustment of the sender. Lastly,
g to the invention, non-agreement
oment when the second pointer ex-
rees in position with the principal
of the auxiliary receiver in the ar-
nt last described, is rendered per-
optically or acoustically by closing
it of a signal by way of a contact-
the auxiliary receiver.
nvention is digrammatically illus-
y way of example in the accom-
drawings, wherein:—
1 is an elevation, parts being
away, showing sight adjusting
aving a plurality of adjusting de-
stages of adjustment. The other
ow details of means shown in Fig.
enlarged scale. More particularly,
ows the details of the fourth stage
ting device in Fig. 1;
Fig. 7 is a plan
the completed driving device of
adjusting device in Fig. 1 and
ows, enlarged, the contact device
he forms shown in Figs. 6 and 7;
a plan showing the electrical trans-
levice indicated in the ninth ad-
evice in Fig. 1;
Figs. 10 and 11 are
vations of the sender and receiver,
ely,
and Fig. 12 shows details of ht which is to be adjusted is desig-
in Fig. 1. Other large and small
e used for designating equivalent
ch occur frequently and are differ-
y appended numerals. Like num-
nate that the parts belong to the
usting device, and letters without
rical index are used in the text of the description for the sake of simplicity as a common designation of all equivalent parts; for example, the various driving motors $M_1$, $M_2$, $M_3$ and so on are designated briefly as motors M when all the motors are referred to.

The individual figures will now be described.

Figure 1:
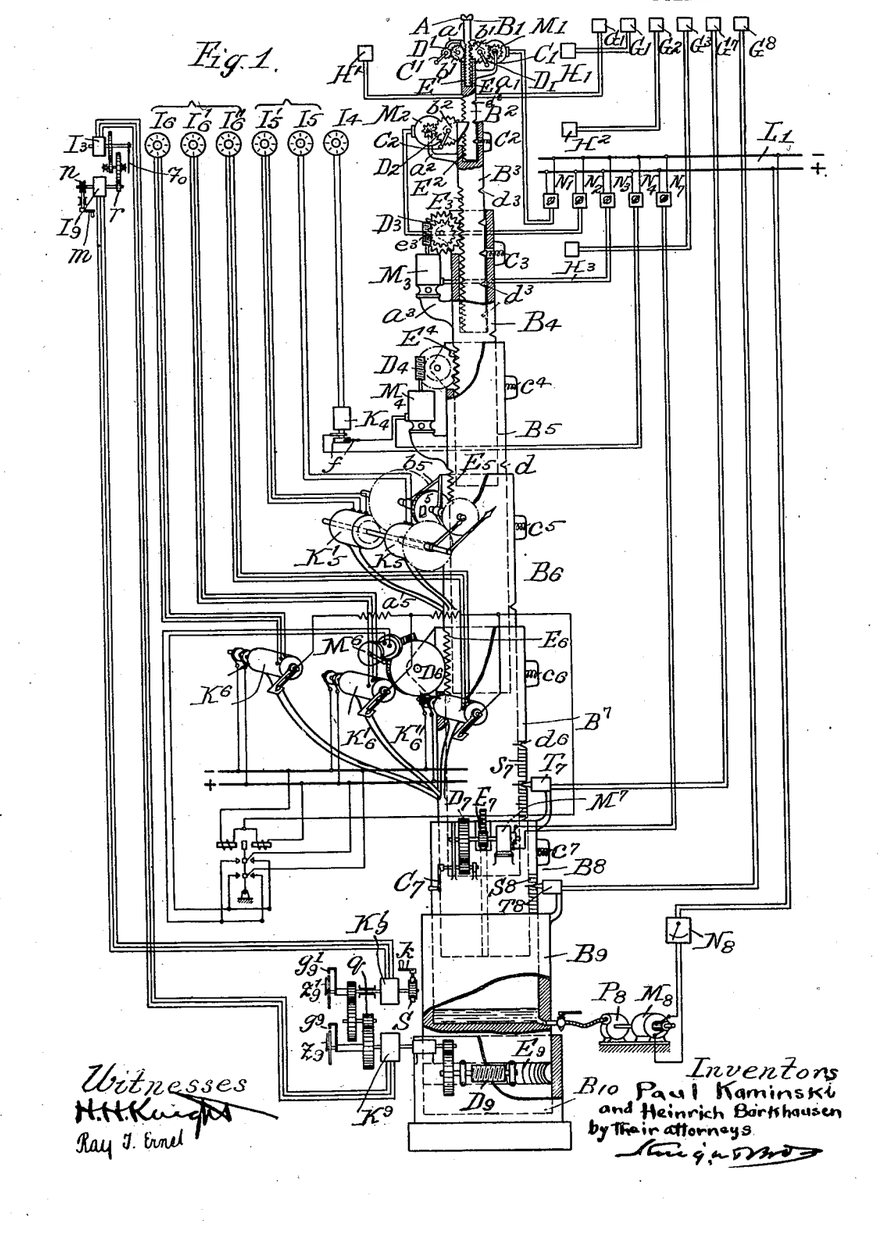

Referring firstly to Fig. 1, ten members $B_1$ to $B_{10}$ are here shown, of which the top member $B_1$ carries the sight A. The member $B_1$ itself and the members $B_2$ to $B_9$ are each carried by the member next below them. The member $B_{10}$ forms the base of the entire system and carries the entire adjusting apparatus, because the other auxiliary parts or elements are all attached to their members B. Each member B and the part appertaining to it, whose connection, as mentioned above, is indicated by similar numerals, forms an adjusting device of the kind according to our invention. Accordingly, the individual adjusting devices are connected in series. They can be moved by crank handles C of which only $C_1$, $C_2$, $C_7$ are shown in Fig. 1 and wheels or gears D which may all be driven by motive power, e.g. as shown in the illustrative embodiment, by direct current motors M which may be connected to the feeders $L_1$ and controlled by means of the controllers N. Thus the movement of the devices by the crank handles by hand may remain only for emergency. The adjustment is brought about gradually by means of a number of stages or steps, on the basis of indications which are made visible by means of the sender devices G or I at the indicating devices H or K, respectively, arranged in the operator's room. Any desired system of transmission and also any suitable constructional form of the sending and receiving apparatuses, may be employed as these do not, in themselves, form a part of the invention and do not in any way influence the construction of the adjusting devices according to the invention.

The adjusting members B are each provided with a rack bar E in which their respective gear wheels engage. The member $B_1$ of the top adjusting device has two such rack bars, namely, at the right-hand a coarse one $E_1$, in which the gear $D_1$ meshes, and at the left-hand a fine one E', with which the gear D' meshes, while the remaining members B each have only one rack bar. The gears $D_1$ and D' are moved by crank handles $C_1$ and C', respectively. The adjustment is brought about firstly with approximate exactness by turning the crank handle $C_1$ and subsequently with greater exactness by turning the crank handle C'. At the side of the rough adjustment a motor $M_1$, having a controller $N_1$, is provided for accelerating this adjustment if desired.

$G_1$, $H_1$ and G', H' are respectively the sender and receiver of the signaling system for signaling both either a rough or fine adjustment of the member $B_1$ and its amount and direction. Consequently, the rod $B_1$ together with its two rack bars $E_1$, $E'$, the two gears $D_1$, $D'$, the appertaining crank handles $C_1$, $C'$, and the signaling devices $G_1$, $H_1$ and $G'$, $H'$ in themselves are a complete adjusting device according to the invention, and form the simplest constructional form of the invention. Fig. 1 shows, however, an adjusting apparatus comprising a very large number of stages or adjusting devices, of which the adjusting devices $C'$, $D'$ and $C_1$, $D_1$, together with the motor $M_1$, are carried on brackets $a_1$, $a'$ or on plates $b_1$, $b'$ by a second adjustable member $B_2$. As this member, in the illustrative embodiment and as mentioned above, has only one rack bar $E_2$, the gear $D_2$ carried by the bracket and plate $a_2$, $b_2$ on the third member $B_3$ suffices for its adjustment, said gear $D_2$ being able to be moved by hand by a crank handle $C_2$ or through the medium of a motor $M_2$ by the controlling device $N_2$. The adjustment is secured a stage at a time by a spring catch $c_2$ which snaps into notches provided on $B_2$.

The adjusting devices for the member $B_3$ differ from those for the member $B_2$ only in that the crank handle is omitted, it being assumed that this member shall effect, as compared with the member $B_2$, a rough adjustment and therefore it suffices to drive it by the motor $M_3$, whose speed is, however, reduced by worm gearing $e_3$.

For adjusting the member $B_4$, instead of the signaling device $G'$, $H'$ we provide a signaling device which operates with direct current and whose sender $I_4$ works synchronously with the receiver $K_4$. This signaling device serves simultaneously for connecting in circuit the motor $M_4$ as the circuit of this motor contains two sliding contacts $f_4$ which close the motor circuit only in definite positions. The other devices are the same as those for the member $B_3$.

Figures 3, 4:
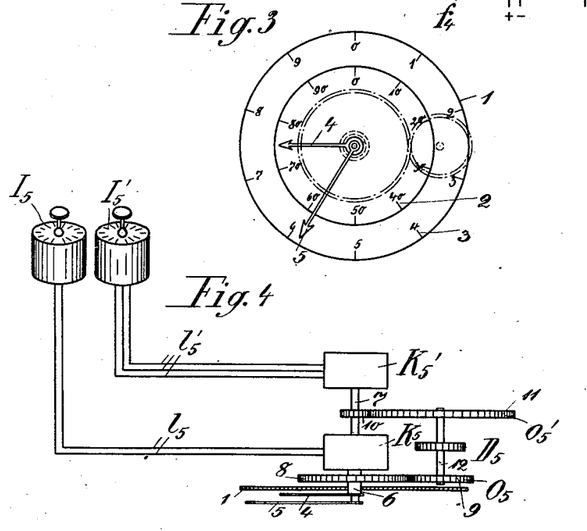
Fig. 3 is an
of the pointer and indicating dial.
Fig. 4 is a plan of the driving
the fifth adjusting device in Fig.
is an elevation showing the sender
n and Fig. 6 is a like view of the
n of the contact apparatuses at
vers in Fig. 7.
Figure 5:
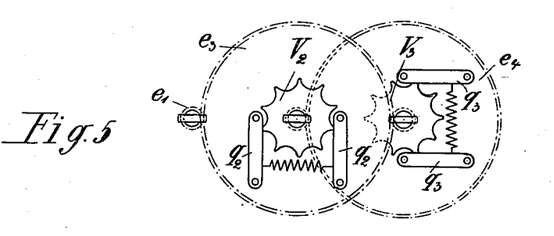
Figure 6:
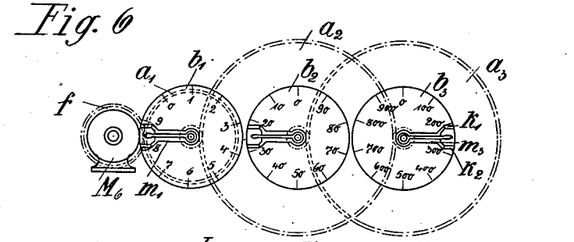

For the member $B_5$ we provide a somewhat more complicated adjusting means (see Fig. 1), whose essential feature is that the receivers of two synchronously-operating electrical adjusting devices $I_5$, $K_5$ and $I'_5$, $K'_5$ are utilized for moving the adjusting gear and admit of a rough and a fine adjustment of the principal gear $D_5$ within the same range of adjustment of $B_5$ by way of two adjustable intermediate gears $O_5$, $O'_5$ which are independent of each other and which have suitable ratios of transmission. This form of adjusting means is shown in Figs. 3 and 4 and will be described more detailed hereinafter.

For adjusting the member $B_6$ we provide means which adjust in three stages, and which are electrically controlled themselves and control electrically, the driving motor $M_6$ for the principal gear $D_6$. These means will also be described more detailed hereinafter with reference to Figs. 5 to 8.

In the adjusting device $B_7$, the reference character $T_7$ designates one of the indicators mentioned in the beginning; the indicator is arranged close beside a scale $S_7$ on the part to be adjusted, i. e. $B_7$, and, by indicating the agreement of the pointers on the indicating device and scale, it prevents incorrect adjustments. The indicator $T_7$ is carried by the member $B_8$. As driving means we again provide an electric motor $M_7$ which may be controlled by a controller $N_7$ and which moves a gear $D_7$ meshing with rack bar $E_7$ provided on the member $B_7$. An emergency driving device is also indicated by a crank handle $C_7$ and a step locking device is also indicated The adjusting device for the member $B_8$ is similar to the previous devices only in so far as, for ascertaining the signals, an indicator $T_8$ similar to the indicator $T_7$ is provided, which is carried by the member $B_9$, i. e. the last movable member of the series, and it coöperates with a scale $S_8$ on member $B_8$. Otherwise, the constructional form wholly differs from the previously described devices, because the member $B_8$ represents a piston which is movable in the member $B_9$ and is lifted with the aid of a centrifugal pump $P_8$, driven by the motor $M_8$, which pump delivers water under pressure, compressed air or other fluids into the cylinder $B_9$.

Lastly, for adjusting the member $B_9$, we provide a worm gear comprising horizontal worm wheel $E_9$ and worm $D_9$. It is to be noted that this gear is driven by two electrical devices operated from a distance which comprise synchronously running receivers and, besides the principal pointers $z_9$, $z'_9$ of the receivers have additional pointers $g_9$, $g'_9$ which can be positively adjusted with the aid of multiple gearing and a specially-provided crank handle $k$. This device is more particularly described hereinafter with reference to Figs. 9 to 12 which show the details of the same.

The principal features of the apparatus shown in Fig. 1 will now be understood. The remaining figures, which show enlarged adjusting devices $B_4$, $B_6$ and $B_9$, clearly show that all the adjusting devices shown in Fig. 1 may exist independently and be combined in any desired manner with each other. Accordingly they will now be described, with small unimportant additions, as four independent means of adjustment.

Figure 2:
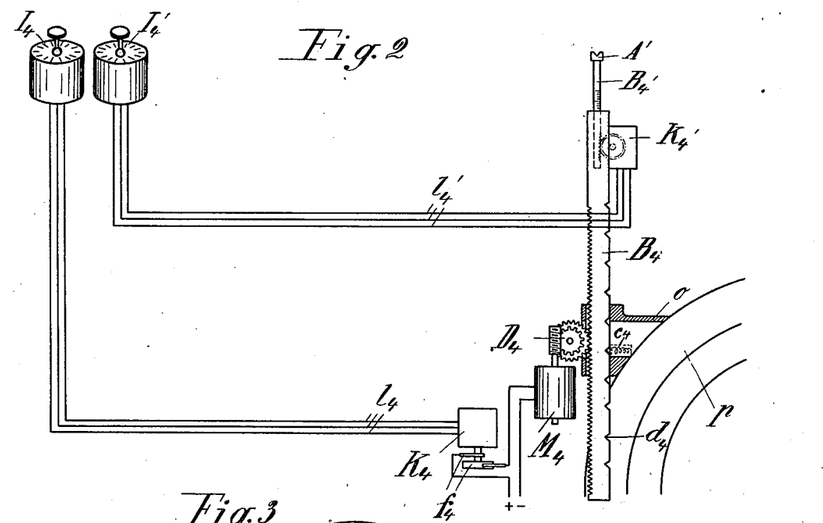

Referring to Fig. 2, a rack $B'_4$ carrying a sight $A'$ is mounted on the rack $B_4$, and for adjusting each rack we provide an electric three-phase system of transmission, in which by adjusting the armatures in the sender devices $I_4$ and $I'_4$, the armatures of iving apparatuses K'$_4$ and K'$_4$, which trically connected by means of the l$_4$ and l'$_4$ with the senders, are driven neously and with the same angular i. e. synchronously. The rack B$_4$ or roughly adjusting the sight and is in a support o shown attached to a The rod B'$_4$ serves for the fine ad-
it, and is carried and moved to-
with the appertaining adjusting de-
$_4$ by the rack B$_4$. For the rough ad-
it we provide gearing D$_4$ comprising
ed wheel, worm wheel and a worm
by the motor M$_4$. The motor itself
rolled by way of slip rings f$_4$ by the
r K$_4$. Obviously, the fine and rough
nent devices can be operated in any
order.

adjusting device according to Figs. 3 differs from the corresponding repre-
on of the adjusting device B$_5$ shown
: 1 only in that the dial 1 having
2 and 3 for the pointers 4 and 5 is The pointers are arranged concen-
7 in the manner customary in clocks,
inter 4 being fast on the hollow shaft
en by the motor K$_5$ for rough adjust-
while the pointer 5 is fast on the shaft
ected with the motor K'$_5$ for fine ad-
nt. The hollow shaft 6 also carries
st wheel 8 of the gearing O$_5$, whose
wheel 9 drives the shaft 12 carrying
ain driving wheel D$_5$; the first wheel
the gearing O'$_5$, whose second wheel
) drives the shaft 12 of the wheel D$_5$,
contrary, is fast on the shaft 7. The
ar which is to be adjusted is driven by
eel D$_5$ in the manner described above
eference to Fig. 1. The independence
adjusting devices from one another
served here also. For example the
er to be adjusted may first be adjust-
means of the device I$_5$ for rough ad-
ent, when the adjusting device K$_5$ to-
with its axle 6 and the pointer 4
be set as accurately as the conditions
t to the desired point, e. g. between
imbers 7 and 5. Then the second ad-
g device I'$_5$ will be operated, so that
ljusting device K'$_5$ together with the
and pointer 5 is now set to the de-
digit 5 on the dial, whereas it may
previously been rotated, in consequence
e connection of the shaft 6 with the
10 and the shaft 12, and have re-
d stationary at a position, say at the
er 6 or 7, near the desired position.
orrection of the position of the pointer
ultaneously corrects the position of the
er 4 and, consequently, of the device
adjusted connected with the pointer
e wheel D$_5$, so that the device to be ad-
l may be considered as adjusted with
ent accuracy.

th reference to the following two ar-
rangements of means shown in Figs. 5 to 11, in the description of Fig. 1 so little has been said regarding them and they have so little direct relation to the other figures that, with the exception of some principal parts, new reference characters are used for the remaining parts.

Figures 7, 8:
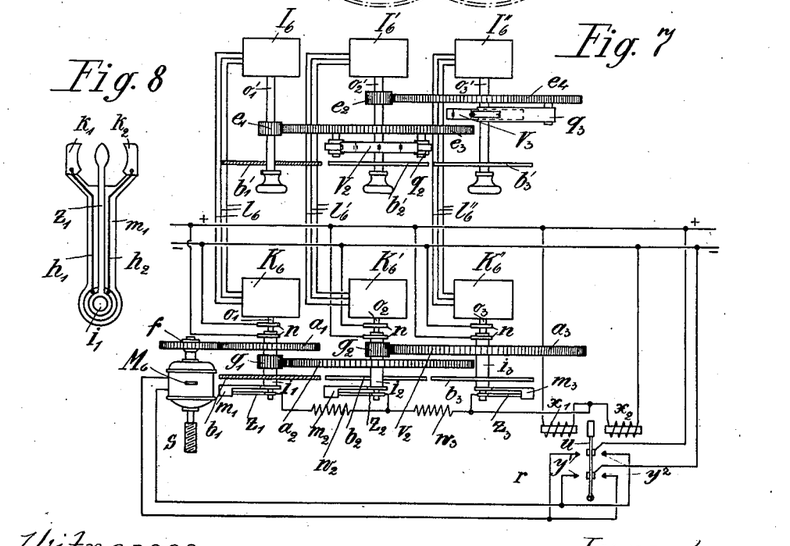
Figure 9:
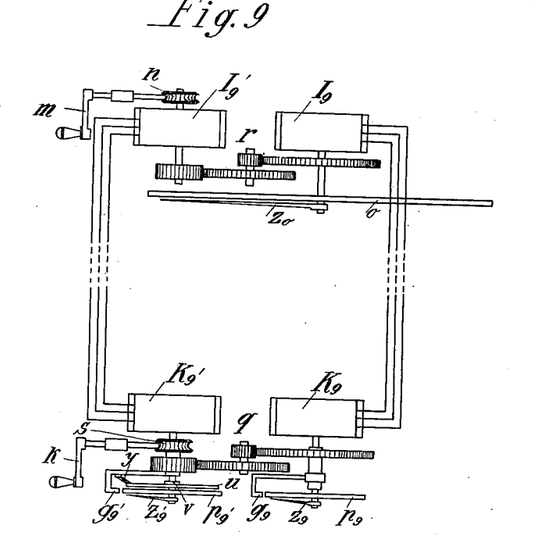

Referring to Figs. 5 to 8 the connection with Fig. 1 is preserved by the designations M$_6$ for the motor, I$_6$, I'$_6$, I''$_6$ for the senders and K$_6$, K'$_6$, K''$_6$ for the receivers of the signaling systems. The main driving means D$_6$ in Fig. 1 is connected to the worm s attached to the motor as shown in Fig. 8. In the illustrative embodiment a threefold subdivision according to the decimal system is provided. The motor M$_6$ acts through the medium of the worm s on the devices, shown in Fig. 1, which are to be adjusted. It simultaneously drives, through the medium of a pinion f, a set of gears a$_1$, a$_2$, a$_3$ which are coupled in such manner by means of smaller gears g$_1$, g$_2$ arranged on the axles i$_1$, i$_2$ of the two former gears that one revolution of the gear a$_1$ causes the gear a$_2$ to rotate one-tenth of a revolution, and one revolution of the gear a$_2$ causes the gear a$_3$ to rotate one-tenth of a revolution. Dials b$_1$, b$_2$, b$_3$ which are marked with the various scales for the division of the movement, the units being marked on the first, the tens on the second and the hundreds on the third, are arranged co-axially with the gears. Contact arms m$_1$, m$_2$, m$_3$ which have on their free forked ends two contacts k$_1$, k$_2$ (Fig. 8) which are connected by con-
ductors h$_1$, h$_2$ arranged inside the axles i$_1$, i$_2$, i$_3$ and by slip rings n with two poles of a direct current system, are fast on the axles of the gears. The axles i$_1$, i$_2$, i$_3$ of the gears are hollow and arranged within them are the axles o$_1$, o$_2$, o$_3$ of three receiving devices K$_6$, K'$_6$, K''$_6$, moved in any desired manner by the sending apparatuses I$_6$, I'$_6$, I''$_6$ of the sender station. The axles of these receiving devices carry pointers z$_1$, z$_2$, z$_3$ which move in front of the dials b$_1$, b$_2$, b$_3$ and between the contacts k$_1$, k$_2$. The three pointers are connected by way of resistances w$_2$, w$_3$, with one another and the last pointer z$_3$ is connected by way of the coils x$_1$, x$_2$ of a double acting relay r to the two poles of the direct current system. The armature u of this relay influences the motor M$_6$ in such manner, through the medium of double contacts y connected with the system, that the motor receives current of different direction according to the position of the armature for the time being and rotates correspondingly.

The sending devices I$_6$, I'$_6$, I''$_6$ are connected together (see Figs. 5 and 7) in a manner similar to that in which the adjusting devices K$_6$, K'$_6$, K''$_6$ are connected. Namely, pinions e$_1$, e$_2$ are fast on the axles $o'_1$, $o'_2$ of the unit sending devices $I_6$ and $I'_6$; these pinions mesh with gears $e_3$, $e_4$, respectively, loose on the axles $o'_2$ and $o'_3$, the ratio of transmission being selected 1:10 for each pair of wheels. Further, the axles $o'_2$ and $o'_3$ carry fast on them wheels $V_2$ and $V_3$ each having 10 notches, in which levers $q_2$ and $q_3$ fulcrumed on the loose gears $e_3$ and $e_4$, respectively, engage. Dials $b'_1$, $b'_2$, $b'_3$, not shown in Fig. 5 for the sake of clearness, are arranged concentrically with the axles. In consequence of the coupling by means of toothed or notched wheels the entire apparatus can be adjusted on the one hand by the units adjusting device $I_6$ or by this and the device $I'_6$, or on the other hand by separately rotating all the devices.

By turning the sending devices $I_6$, $I'_6$, $I''_6$ as desired, the armatures and axles of the receiving devices $K_6$, $K'_6$, $K''_6$ have imparted to them a rotary motion which firstly causes one or more of the pointers $z_1$, $z_2$, $z_3$ to lie against one of the contacts $k_1$, $k_2$ and short circuit one of the coils $x_1$ or $x_2$ of the relay, so that the other coil now attracts the armature $u$ and the motor $M_6$ receives current by way of the corresponding contact $y$ and brings about the adjustment of the member which is to be moved. For instance if pointer $z_1$ contacts with the contact $k_1$, which may be connected to the negative pole of the direct current system then coil $x_2$ is short circuited, because the current flows from the positive feeder over coil $x_1$, resistance $w_3$, $w_2$, $w_1$, pointer $z_1$, contact $k_1$, conductor $h_1$ to the negative feeder. Coil $x_1$, being then energized attracts the armature $u$ and thereby throws the feeders onto contacts $y'$ of the motor circuit which causes the motor to run in a certain direction, whereas when armature $u$ closes contacts $y_2$ the motor receives current in the other direction and runs the reverse way. At first only the position of the pointer $z_5$ comes into question; the other pointers are either controlled by the same tension, or the difference in potential is negatived in the resistances $w_1$, $w_2$ and these prevent the two feeders of the system being short circuited. At the same time as the adjustment commences, the motor $M_6$ sets the entire gearing $f$, $a_1$, $g_1$, $a_2$, $g_2$, $a_3$ in motion, so that the gear $a_3$ rotates in the direction of the motion of the device $K''_6$ until it finally arrives in a position, in which the pointer $z_3$ leaves the contact against which it was lying. The relay $r$ now obtains no current from the pointer $z_3$. If the second sending device $I'_6$ and the pointer $z_2$ with its contacts $k_1$, $k_2$ which likewise influence the relay $r$ now operate, the same operation with regard to the gear $a_2$ and the appertaining pointer contact is repeated, so that the motor $M_6$ receives current again and in a direction which equalizes, within the limits of possibility of the first fine adjustment, the error which remained in the first rough adjustment. The pointer $z_2$ is then also placed between its contacts $k_1$, $k_2$ and the relay $r$ obtains no more current by way of it. The third sending device $I_6$ is now operated, actuates the relay $r$ and consequently the motor $M_6$ afresh and also equalizes the error which remained from the second adjustment. The final adjustment brought about by the motor $M_6$ is now effected to exactly 1/100th of a revolution of the rough adjusting device $I''_6 K''_6$. When large motors are used an automatic starting device will be provided instead of the relay $r$.

In Figs. 9 to 12 the designations $I_9$, $I'_9$ for the senders, $K_9$, $K'_9$ for the receivers, $z_9$, $z'_9$ for their principal pointers, $g_9$, $g'_9$ for the additional pointers and $k$ for the crank handle at the receiving apparatus indicate the connection of these parts with the ninth adjusting device in Fig. 1; the remaining reference characters have no relation to the other figures. $I_9$, $K_9$ denote the sending and receiving device for rough adjustment and $I'_9$, $K'_9$ denote the sending and receiving device for the more accurate adjustment. The sending devices $I_9$, $I'_9$ are connected with one another by a gear $r$ in such manner that the auxiliary sender $I'_9$ rotates, for example, ten times while the principal sender $I_9$ moves within one revolution over the entire range of adjustment. The sending device is driven by means of a crank handle $m$ which first acts through the medium of a worm wheel $n$ on the auxiliary sender $I'_9$ and by means of the gear $r$ on the principal sender $I_9$. The adjustment is effected according to a scale $o$, over which the pointer $z_0$ of the principal sender $I_9$ moves. Obviously the auxiliary sender may also be provided with a scale, but having regard to the large scale of the principal sender is not generally necessary. Pointers $z_9$, $z'_9$ which move over the fixed dials $p_9$, $p'_9$, are connected with the axles of the two receiving devices $K_9$, $K'_9$. In spite of the scale divisions on the two dials being alike in general, in consequence of the ratio of transmission of the gearing connecting the two pointers the adjustment on the dial $p'_9$ can be read with an exactness which is increased in proportion to this ratio of transmission. Concentrically with these two dials are arranged additional pointers $g_9$, $g'_9$ coupled by a second gear $q$ of the same ratio of transmission as that of the sender system and connected with the member to be adjusted. When the crank handle $k$ which acts through the medium of a worm wheel $s$ on the additional pointer $g'_9$ is turned so that the pointers $g_9$ and $g'_9$ register with the pointers $z_9$ and $z'_9$, respectively, both the two additional pointers and also the device connected therewith

Figures 10, 11, 12:
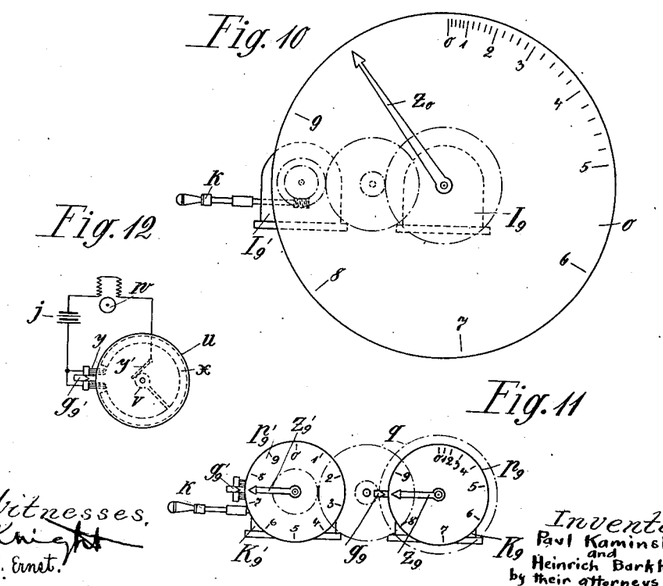

| to the position indicated by
| perated by the transmitter.
| tomatically to control the cor-
| nt of the auxiliary second
| e arrange on the axle of the
| iver K′₀ a dial u, shown sep-
| the receiver K′₀ in Fig. 12,
| inular interrupted contact bar
| onnected by means of a slip
| brush y′ by way of an alarm
| pole of a source of current j.
| y which are connected with
| pointer slide on the contact
| connected in such manner to
| e of the source of current j
| the pointer g′₀ is adjusted
| the pointer z′₀ the circuit of
| is closed, but is interrupted
| tional pointer g′₀ is correctly
| the auxiliary receiver K′₀.
| nent can obviously be varied
| red, the signal is sounded only
| ect position is obtained; also,
| int may be such that the bell
| en the two additional pointers
| neir appertaining marks.

| r adjusting an object from a
| rising a movable support and
| members controllable from a
| member adapted to move said
| able distance along one given
| direction, the range of motion
| d members, except the lower-
| fractional part of the range
| ne of the other members.
| r adjusting an object from a
| rising a movable support, and
| members controllable from a
| oving said support, said mem-
| djusting means and transmis-
| ach of said devices compris-
| tter and a receiver connected
| ponding adjusting means, the
| idapted to move said object
| suitable distance in either di-
| ange of motion of one of said
| g a fractional part of the mo-
| the other members.
| r adjusting objects from a dis-
| sing a support, having a plu-
| bers supported by each other,
| adapted to move in suitable
| r direction, relatively to its
| ember, the range of motion of
| member constituting a frac-
| tion of its supporting member
| r independently moving and
| dependently controlling from
| extent of relative motion of

| r adjusting objects from a dis-
| sing a support, having a plu-
| bers supported by each other,
| adapted to move in suitable steps in either direction relatively to its supporting member, the range of motion of the supported member constituting a fraction of the motion of its supporting member, means for independently operating each member and electrically controlled transmission devices for independently controlling from a distance the extent of relative motion of each member.

5. Means for adjusting an object from a distance, comprising a movable support, and a plurality of members controllable from a distance for moving said support, said members having adjusting means and electrical transmission devices, each of said devices comprising a transmitter and a receiver moving synchronously with the transmitter and connected with a corresponding adjusting means, each of the adjusting means being adapted to move its member step by step a suitable distance in either direction, the range of motion produced by one of said means being a fractional part of the motion produced by one of the other means, and conductors for connecting the transmitter and the receiver.

6. Means for adjusting an object from a distance, comprising a movable support, a plurality of members controllable from a distance for moving said support, said members having adjusting means and electrical transmission devices, each of said devices comprising a transmitter and a receiver moving synchronously with the transmitter and connected with a corresponding adjusting means, each of the adjusting means being adapted to move its member step by step a suitable distance in either direction, the range of motion produced by one of said means being a fractional part of the motion produced by one of the other means, conductors for connecting the transmitter and the receiver, and means for indicating the amount of adjustment.

7. Means for adjusting an object from a distance, comprising a movable support having a plurality of members mutually supporting each other, each individual member adapted to move in suitable steps in either direction relatively to the next lower member, the range of motion of each member constituting a fraction of the motion of the next lower member, and means operated from a distance for controlling the movement of said members.

8. Means for adjusting an object from a distance, comprising a movable support having a plurality of members mutually supporting each other, each individual member adapted to move in suitable steps in either direction relatively to the next lower member, the range of motion of each member constituting a fractional part of the motion of the next lower member, and transmission devices for said members each comprising a transmitter arranged at a distance and a receiver operated by said transmitter and connected to its member.

9. Means for adjusting an object from a distance, comprising a movable support having a plurality of members mutually supporting each other, each individual member adapted to move in suitable steps in either direction relatively to the next lower member, the range of motion of each member constituting a fraction of the motion of the next lower member, and electrical transmission devices, each comprising a transmitter arranged at a distance and a receiver moving synchronously with the transmitter and connected with one of said supporting members, and conductors for connecting the transmitter and the receiver.

10. Means for adjusting an object from a distance, comprising a movable support having a plurality of members, mutually supporting each other, each individual member adapted to move in suitable steps in either direction relatively to the next lower member, the range of motion of each member constituting a fraction of the motion of the next lower member, means operated from a distance for controlling the movement of the members, and means for indicating the amount of motion of each member.

11. Means for adjusting an object from a distance, comprising a movable support having a plurality of members mutually supporting each other, each individual member adapted to move in suitable steps in either direction, the range of motion of each member constituting a fractional part of the motion of the next lower member, transmission devices for said members each comprising a transmitter arranged at a distance and a receiver operated by said transmitter, and means for indicating the amount of motion of each member.

12. Means for adjusting an object from a distance, comprising a movable support having a plurality of members mutually supporting each other, each individual member adapted to move in suitable steps in either direction, the range of motion of each member constituting a fraction of the motion of the next lower member, and electrical transmission devices, each comprising a transmitter arranged at a distance and a receiver moving synchronously with the transmitter and connected with one of said supporting members, conductors for connecting the transmitter and the receiver, and means for indicating the amount of motion of each member.

13. Means for adjusting an object from a distance, comprising a movable support, a motor for moving said support in suitable steps in either direction, and a plurality of electrical means adapted to control the operation of said motor to cause coarse and fine adjustment of the support, each of said controlling means comprising a transmitter arranged at a distance and a receiver operated by said transmitter and adapted to control said motor.

14. Means for adjusting an object from a distance, comprising a movable support, a motor for moving said support in suitable steps in either direction, a plurality of electrical means adapted to control the operation of said motor, consisting of coarse controlling means causing motor operation for adjusting the support approximately in full steps, and fine controlling means causing motor operation for exact adjustment in fractions of said steps, each of said coarse and fine controlling means comprising a transmitter arranged at a distance and a receiver operated by said transmitter and adapted to control said motor, and means for interconnecting said coarse and fine controlling means.

15. Means for adjusting an object from a distance, comprising a movable support, a motor for moving said support in suitable steps in either direction, a plurality of electrical means adapted to control the operation of said motor, consisting of coarse controlling means causing motor operation for adjusting the support approximately in full steps, and fine controlling means causing motor operation for exact adjustment in fractions of said steps, each of said coarse and fine controlling means comprising a transmitter arranged at a distance and a receiver operated by and synchronously with said transmitter and adapted to control said motor, conductors connecting said transmitter and the receiver and means for interconnecting said coarse and fine controlling means.

16. Means for adjusting an object from a distance, comprising a movable support, a motor for moving said support in suitable steps in either direction, a plurality of electrical means adapted to control the operation of said motor, consisting of coarse controlling means causing motor operation for adjusting the support approximately in full steps, and fine controlling means causing motor operation for exact adjustment in fractions of said steps, each of said coarse and fine controlling means comprising a transmitter arranged at a distance and a receiver operated by and synchronously with said transmitter, conductors connecting said transmitter and the receiver, means for interconnecting said coarse and fine controlling means, and means for indicating the amount of adjustment.

17. Means for adjusting an object from a distance, comprising a movable support, an electrical motor for moving said support in suitable steps in either direction, a plurality of electrical means adapted to control the iid motor, consisting of coarse
ans causing motor operation
the support approximately in
l fine controlling means caus-
ration for exact adjustment in
id steps, each of said coarse
rolling means comprising a
ranged at a distance and a
ated by and synchronously
smitter, conductors connecting
er and the receiver, means for
g said coarse and fine control-
eans for indicating the trans-
t of adjustment, and means
h the individual receivers for
he motor current when the
usted the support the desired or adjusting an object from a
prising a movable support, a
neans controlled from a dis-
ljusting said support and
ve it in suitable steps in either
range of motion controlled by
ans being a fractional part of
ntrolled by one of the other
plurality of rectifying means
1 the object to be adjusted, for
adjustment, the range of cor-
olled by one means being a
t of the correction of one of
ns.

or adjusting an object from a
prising a movable support, a
neans controlled from a dis-
sting said support and adapted
bject in suitable steps in either
range of motion controlled by
ans being a fractional part of
ntrolled by one of the other
ality of rectifying means con-
he object to be adjusted for
adjustment, the range of cor-
by one means being a frac-
the correction of the other
eans for interconnecting said
ifying means for causing a
movement of the rectifying or adjusting an object from a
prising a movable support, a
neans controlled from a dis-
sting said support, means for
g said adjusting means for
nent of said object in suitable
r direction, the range of ad-
rolled by one of said means
ional part of the range con-
of the other means, a plurality
means connected with the ob-
isted, each adapted to correct the adjustment, the range of correction con-
trolled by one means being a fractional part
of the range of correction of the other
means.

21. Means for adjusting an object from a
distance, comprising a movable support, a
motor for moving said support in steps in
either direction, a plurality of electrical
means for controlling said motor consisting
of coarse controlling means causing motor
operation for adjusting the support ap-
proximately in full steps, and fine control-
ling means causing motor operation in frac-
tions of said steps for exact adjustment, each
of said coarse and fine controlling means
comprising a transmitter arranged at a dis-
tance, and a receiver operated by the trans-
mitter and connected to said motor, a plu-
rality of rectifying means connected with
the object to be adjusted, each adapted to
correct the amount of support, the range of
correction given by one means being a frac-
tional part of the correction of one of the
other means, means for interconnecting said
different controlling means, and means for
interconnecting said different rectifying
means, for causing a simultaneous movement
of said controlling and rectifying means re-
spectively.

22. Means for adjusting an object from a
distance, comprising a movable support, an
electrical motor for moving said support in
steps in either direction, a plurality of elec-
trical means for controlling said motor, consisting of coarse controlling means causing
motor operation for adjusting the support
approximately in full steps, and fine con-
trolling means causing motor operation in
fractions of said steps for exact adjustment,
each of said coarse and fine controlling
means, comprising a transmitter arranged at
a distance, and a receiver operated by and
synchronously with the transmitter, con-
ductors for connecting the transmitter and
the receiver, a plurality of rectifying means
connected with the object to be adjusted each
adapted to correct the adjustment in its cor-
responding step, means for interconnecting
said different controlling means, and means
for interconnecting said different rectifying
means to cause a simultaneous movement of
said controlling means and rectifying means
respectively.

In testimony whereof we have signed our
names to this specification in the presence
of two witnesses.

HEINRICH BARKHAUSEN.
PAUL KAMINSKI.

Witnesses:
HENRY HASPER,
WOLDEMAR HAUPT.